Figure 1:
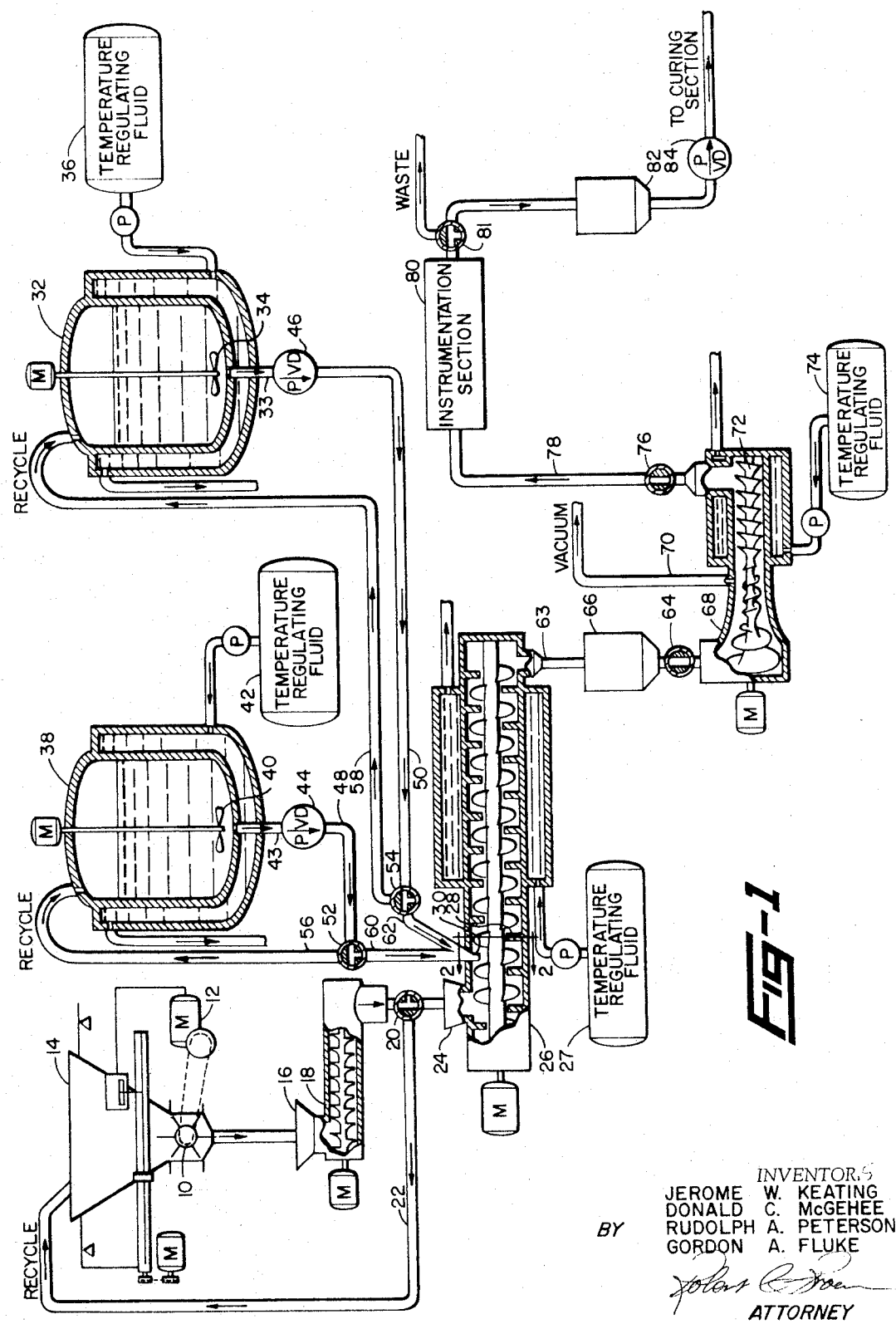

Jan. 3, 1967  G. A. FLUKE ET AL  3,296,043
CONTINUOUS MIXING PROCESS FOR SOLID RESIN BASE PROPELLANTS
Filed Oct. 26, 1961  3 Sheets-Sheet 1

INVENTORS
JEROME W. KEATING
DONALD C. McGEHEE
RUDOLPH A. PETERSON
GORDON A. FLUKE

BY

ATTORNEY

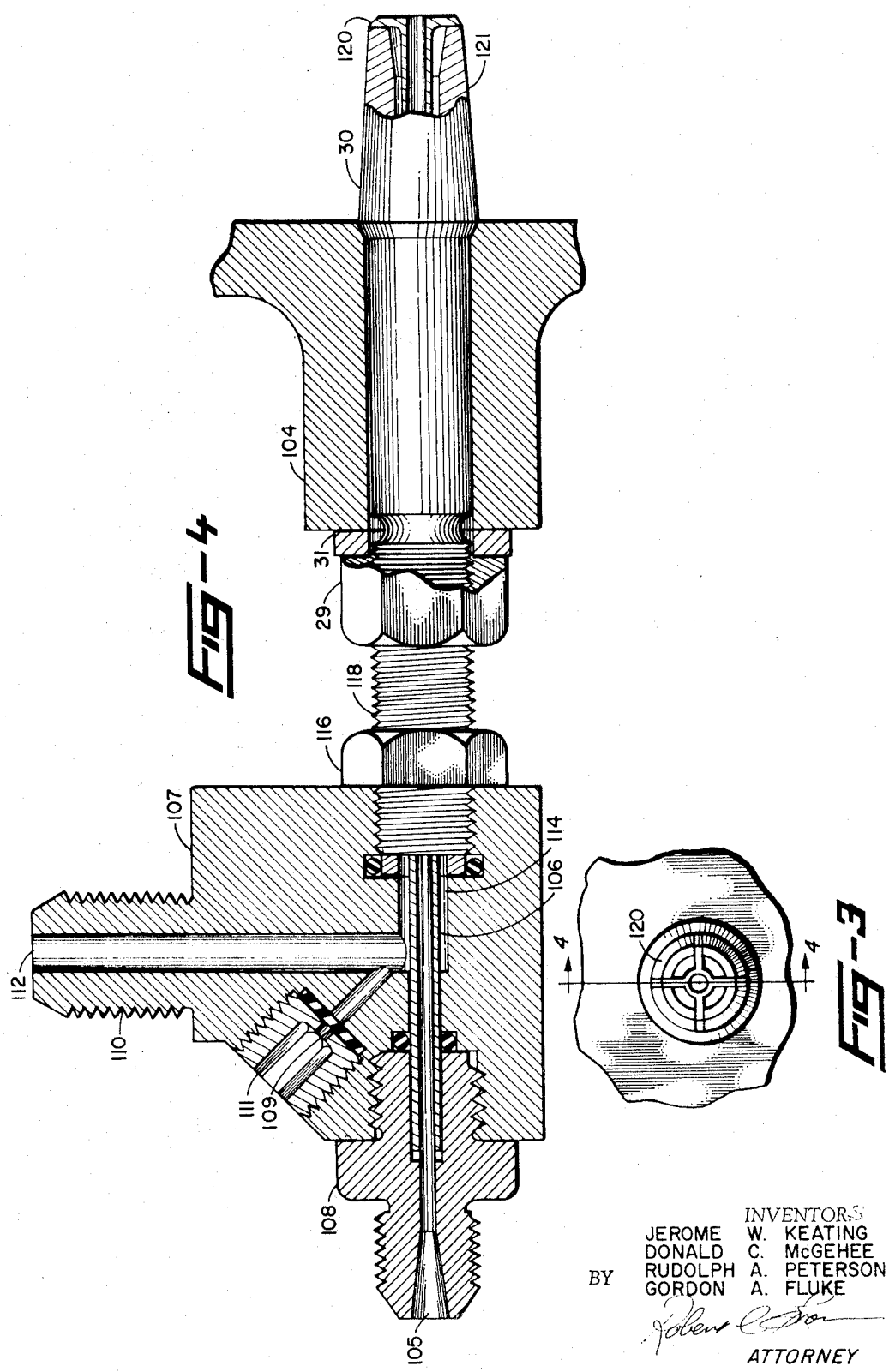

3,296,043
CONTINUOUS MIXING PROCESS FOR SOLID
RESIN BASE PROPELLANTS
Gordon A. Fluke, Rancho Cordova, Jerome W. Keating, Sacramento, Donald C. McGehee, Carmichael, and Rudolph A. Peterson, Rancho Cordova, Calif., assignors to Aerojet-General Corporation, Azusa, Calif., a corporation of Ohio
Filed Oct. 26, 1961, Ser. No. 147,988
9 Claims. (Cl. 149—19)

This invention relates to an improved method for the praparation of solid propellants. In particular, this invention relates to a safe and efficient method for producing solid propellants by using a continuous process.

The disadvantages of batch mixing solid propellants have long been recognized. In batch mixing, a relatively large quantity of propellant, e.g., 2000 pounds or more, is mixed at one time. After the mix has reached a uniform state, it is cast, extruded, or compressed to form the propellant mixture to the desired shape. The material is then cured to polymerize the resin fuel and obtain a final product.

Because of the large quantity of materials being worked in the batch process, it is very dangerous. If an explosion occurs with a batch of propellant mixture in the order of 2000 pounds or more, it is almost certain that great damage will be done. Using ordinary equipment, such an explosion could result in the destruction of an entire plant. To avoid this result, it has been necessary to separate process equipment and distribute it over a large area so that an explosion in one piece of equipment would not affect other equipment. Also, it has been necessary to shield batch processing equipment with heavy masonry, earth, or steel construction so as to confine an explosion to a given area.

In view of the inherent disadvantages of the batch mixing process, it has long been the desire of propellant manufacturers to replace the batch process with a continuous process. Such a continuous process would have the advantage of mixing relatively small quantities of materials at any given time. Thus, an explosion could be easily confied and would not require the very extensive and expensive safeguards required in the batch process.

Although at first glance it might seem easy to convert the process from a batch to continuous basis, such has not proved to be the case. Several propellant manufacturers have had serious explosions in attempting the production of solid propellants through a continuous process. Although the caue of these explosions is not precisely known, it can be safely assumed that they resulted from a process failure in which the propellant materials were subjected to pressures and temperatures that exploded the oxidizer material in the solid fuel mixture.

In order to obtain a high through-put from a continuous process, it is necessary to move a relatively large quantity of material through the process equipment in a given time. Further, in the case of a solid propellant mixture, it is necessary that the material be unimpede by any obstructions in the process equipment. Such an obstruction could cause a rapid pressure build-up or hot spot within the propellant mixture and result in an explosion.

In practice it is very difficult to prevent obstructions from forming in the process equipment while carrying out a continuous process for forming solid propellants. The reason is the fact that the resinous fuel can set up rapidly to form a semisolid which can form an obstruction. When this occurs, there is a build-up of pressure at this point and a hot spot develops. The hot spot can in turn set off the oxidizing material and cause an explosion.

An object of our invention is to provide a method for continuously mixing solid propellants which method avoids pressure build-ups or hot spots within the propellant mixture and thereby prevents the development of a condition conducive to explosion. A further object of our invention is to provide a mixer which can mix large quantities of solid propellant materials without the formation of obstructions which cause pressure build-up and hot spots within the propellant mix. Further objects will become apparent from a reading of the specification and claims which follows.

Our invention comprises a continuous process in which a solid propellant is mixed by introducing the resinous binder and any propellant additives at a point which is within the moving stream of the oxidizer material used in the propellant mixture. The resulting propellant mixture is then mixed in a conventional manner to thoroughly disperse the oxidizer material within the resinous fuel binder.

In forming a solid propellant composition according to our process, we first feed an oxidizing material at a carefully adjusted weight rate into a conveyor which transports it to a continuous mixer. The oxidizing material is introduced into the continuous mixer at or near one of its ends and is transported through the continuous mixer and discharged at the opposite end. The resinous binder material is introduced into the continuous mixer at a point which preferably is downstream from the point of introduction of the oxidizing material. This has been found to decrease the formation of obstructions within the continuous mixer. Quite frequently, the resinous binder used in the propellant mixture comprises two or more components which, during the curing operation, interact to form a thermosetting polymer. In order to avoid premature interaction between the resin components, it is customary to separate them prior to the mixing operation when they are mixed with each other and with the other ingredients required for a solid propellant.

In addition to the oxidizer and the resinous fuel, it is also customary to employ various additives to the solid propellant. Typical of such additives are burning rate catalysts, antioxidants, wetting agents, antifoaming agents, and plasticizing agents. These additives can be added separately to the propellant composition while it is being mixed. Preferably, however, the additives are admixed with the resinous binder material which is then mixed with the oxidizer. In the case of a resinous binder in which the resin components react to form a thermosetting resin, it is preferable to first add the various additive ingredients to one of the resin components. In this manner, one of the resin components acts as a carrier material for the various additives required in the propellant.

When the resin stream, or resin streams in the case of those resins requiring several components, is introduced into the mixing chamber it is, as set forth above, preferably introduced downstream from the point of introduction of the oxidizing material. Further, the resin or resin components containing the additional additive ingredients, such as set forth above, is introduced at a point which is within the moving oxidizer stream. This tends to prevent the formation of obstructions within the mixing chamber. In this manner, pressure build-ups within the mixing vessel are prevented and the presence of hot spots in the propellant mixture is avoided. Thus, optimum safety conditions are obtained in which there is little chance for an explosion to occur.

A further advantage accrues from introducing the resin components at a point which is within the moving oxidizer stream. This advantage is the prevention of short-circuiting of the liquid resin stream which can occur when the resin stream is not introduced at a point within the moving oxidizer stream. Short-circuiting occurs when the liquid resin stream flows along the wall of the mixer or the surfaces of the mixing impeller and is carried through the mixer in a substantially unmixed state. When this happens, the propellant mix produced is not uniform in consistency. Such propellants can form fissures or uneven grain surfaces during the curing operation which can lead to irregular burning and explosion when the propellant is ignited.

Figure 2:
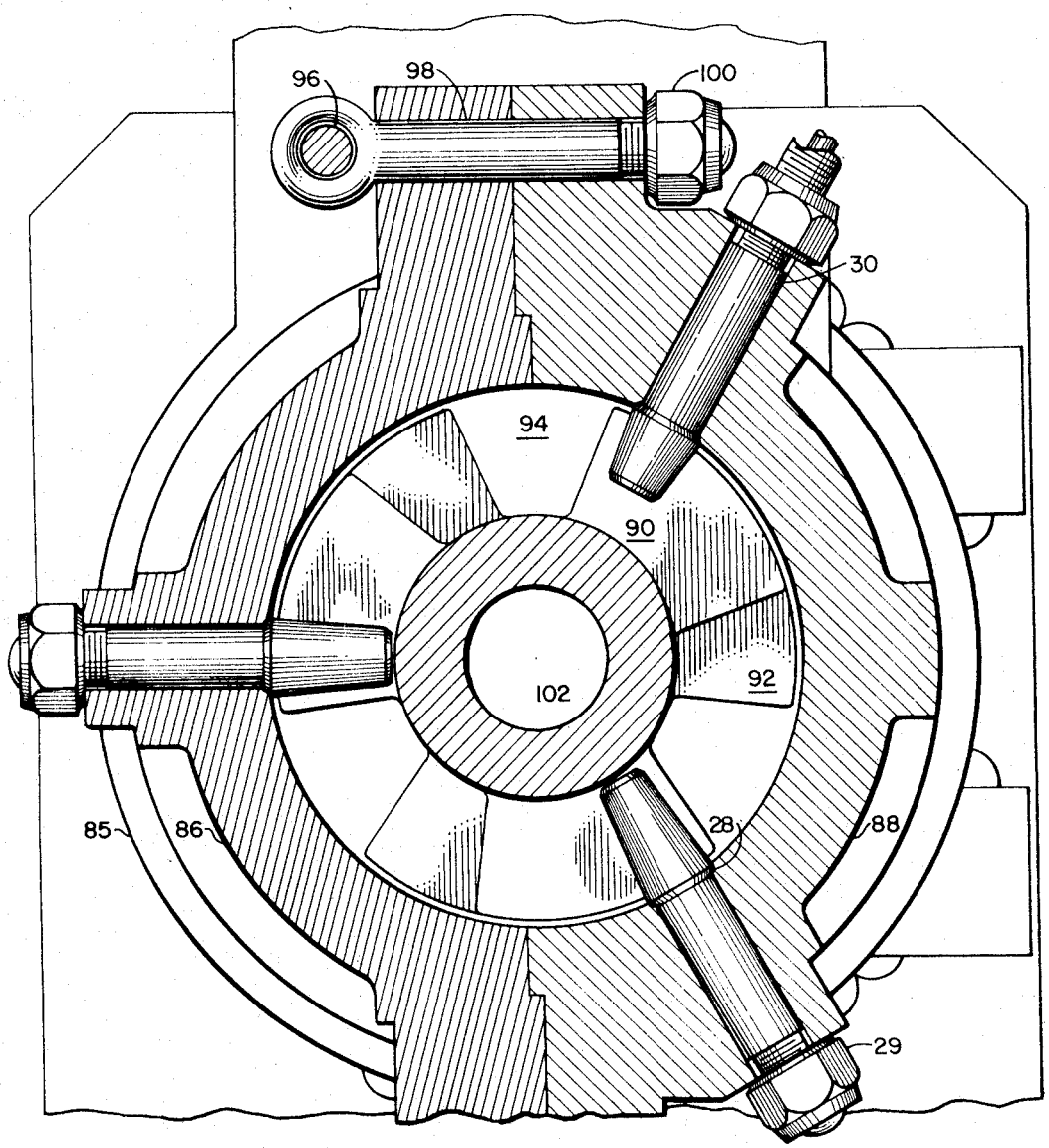

A preferred form of our invention is illustrated by the figures of the drawings in which FIGURE 1 is a general flow diagram for the process, FIGURE 2 is a transverse sectional view of the mixer along the line 2—2 of FIGURE 1, FIGURE 3 is a view of the end of the shortened feed tooth through which the resin components of the propellant are fed into the oxidizer stream, and FIGURE 4 is a sectional view of the resin distributor and shortened feed tooth taken along the line 4—4 of FIGURE 3.

Referring to FIGURE 1, there is shown a loss-in-weight feeder having a rotary valve 10 which is connected to an automatically adjustable speed motor 12. The adjustable speed motor 12 is used to control the speed of the rotary valve 10. The oxidizer is fed to the scale hopper 14 in which it is weighed and fed in a steady stream to the rotary valve 10. It then passes, using gravity feed, into feed inlet 16 of screw conveyer 18.

The oxidizing material is fed through the screw conveyer 18 to a three-way valve 20. Valve 20, when positioned as shown in the drawing, directs the oxidizer stream into feed inlet 24 of mixer 26. When desired, the valve 20 can be turned as to recycle the oxidizer material back into the loss-in-weight feeder. The feed inlet 24 is preferably located at the top of mixer 20 so as to allow the oxidizer to be fed to the mixer through the use of gravity feed. When recycling oxidizer through line 22, the oxidizer is preferably fluidized with an inert gas, such as nitrogen, under pressure. This is necessary since the hopper 14 is customarily located above the mixer 26. Also, however, the oxidizer can be recycled by hand in which case it is discharged into a container which is in turn dumped into the scale hopper 14.

As shown in the preferred embodiment of our process, the mixer 26 is preferably of a screw type which contains a rotatable shaft having screw blades affixed to it which move the propellant material through the mixer. Projecting inwardly from the interior surface of the mixer are stationary teeth 28 which are inter-positioned between the screw blades. The movement of the screw blades coupled with the resistance offered by the stationary inter-positioned teeth thoroughly mixes the propellant material during its travel through the mixer.

The resin fuel, as stated previously, is preferably introduced at a point which is downstream from the point of introduction of the oxidizing material into the mixer. As shown in FIGURE 1, for a polyurethane resin in which one of the resin ingredients is an isocyanate and the other is a polyol, the isocyanate ingredient is introduced from tank 32 in which it is maintained at a carefully controlled temperature level by means of a rotating mixing blade 34 and a jacketed hot water heating system 36. Some isocyanates, for example, tolyene diisocyanate, tend to absorb gases. Thus, the pressure within tank 32 can be adjusted to a relatively low level so as to give a gage pressure within the vessel from about one to about five inches of water. A screen (not shown) is placed in line 33 leading from vessel 32 in order to trap out any large agglomerate particles and prevent their introduction into the pump 46.

A slurry which is generally prepared as a premix in a high-shear type of mixer (not shown) is contained in vessel 38. The slurry contains the polyol ingredient of the resin fuel in admixture with conventional additive components, for example, burning rate catalysts, antioxidants, etc., as referred to previously. The material in vessel 38 is stirred with an impeller 40 whose speed is regulated so as to avoid whipping gases into the slurry.

The temperature of the slurry within vessel 38 is controlled by means of a jacketed heating arrangement 42 through which there may be circulated a hot fluid medium such as hot water. Unlike the tolylene diisocyanate resin component contained in vessel 32, the slurry in vessel 38 does not have a great tendency to absorb gases. Thus, the pressure within the slurry tank can be considerably higher than that in vessel 32. A desirable pressure for the slurry tank has been found to be within the range from about 10 to about 20 p.s.i. The pressure is adjusted to make it equal to the discharge pressure of the pump 44. By so adjusting the pressure, the pump 44 acts as a valve and thereby gives constant flow rate of the slurry through line 48. In order to avoid the presence of any oxygen in the slurry, an inert atmosphere such as nitrogen, argon, krypton or the like is maintained within vessel 38. Nitrogen is a preferred protective atmosphere for both vessels 32 and 38 since it is cheap and readily available.

The diisocyanate component contained in vessel 32 and the slurry contained in vessel 38 are discharged respectively through lines 33 and 43 and variable speed pumps 46 and 44. After passing through variable speed pump 46 the isocyanate stream goes through line 50 to a three-way valve 54. As shown in the drawing, the three-way valve 54 is positioned so as to admit the isocyanate component into line 62 and thence into the mixer. If desired, however, the three-way valve 54 can be positioned so as to recycle the isocyanate component through line 58 and back to the vessel 32.

After passing through variable speed pump 44, the slurry stream passes through a line 48 through a three-way valve 52 from which it can be either routed into the mixer through line 60 or recycled through line 56 back to the vessel 38. Both variable speed pumps 44 and 46 are preferably of a positive displacement type such as a gear pump.

The polyol slurry and diisocyanate streams are fed respectively through lines 60 and 62 into the mixer 26. Both streams enter mixer 26 through a shortened tooth 30 which extends inwardly into the mixer a distance which is approximately half the distance between the interior surface of the mixer and the outside diameter of the rotatable mixer shaft. The structure and relative size of the shortened tooth 30 are shown in more detail in FIGURES 2–4 as described later.

As shown more fully in FIGURE 4, the isocyanate stream from vessel 32 is completely surrounded by the slurry stream from vessel 38 at the point of their introduction to the mixer 26. This mode of introducing the components forms a preferred embodiment of our process since it has been found to aid materially in ensuring that the propellant ingredients are properly mixed without the formation of agglomerate particles within the mixer.

As shown in FIGURE 1, the mixed propellant is ejected from the mixer through an opening 63. Preferably, the size of the opening 63 is large enough to prevent any pressure build-up at this point. In this regard our mixer is quite different from conventional mixers which employ a small-diameter outlet through which the mixed material is extruded. Such a procedure would be extremely dangerous in our process since it would increase the probability of pressure build-up and hot spot formations at the discharge opening 63. The temperature of the mixer 26 is regulated by a jacketed heat transfer system 27 through which there is customarily circulated a heated fluid.

After being discharged through mixer outlet 63, the mixed propellant material passes to surge tank 66. After passing through surge tank 66 the mixed propellent passes through a two-way valve 64 and hence to a deaerator 68 which is connected to a vacuum source (not shown) through line 70. The valve 64 is used to control the feed rate of the mixed propellant into the deaerator 68. While in the deaerator, the propellant material is mixed by a screw impeller 72 which also serves to move the propellant through the deaerator.

Surrounding the discharge section of the deaerator is a heat exchange jacket which is connected to a temperature regulating system 74. A cooling fluid is generally circulated through the temperature regulating system so as to control the viscosity of the propellant material within the deaerator. It is important to keep the viscosity of the propellant material at a sufficiently low level so that it can be pumped without subjecting it to unduly high pressures. This is an important feature in our process since it greatly reduces any tendency for build-up of pressure within the propellant material while it is being moved through the deaerator. An ancillary reason for controlling temperature within the deaerator is to control the temperature of the propellant material prior to casting. Temperature control prior to casting is necessary in order to assure that the propellant material has the requisite fluidity for the casting operation.

After passing through two-way valve 76 the propellant material is conveyed through line 78 to instrumentation section 80. Within the instrumentation section, the propellant mixture is analzyed to determine whether it meets specification. The principle measurement performed here is the determination of the density of the propellant material. The density of the propellant is determined by subjecting it to gamma rays which pass through the propellant mix to a gamma ray detector positioned on the opposite side of the propellant pipeline from the gamma ray source. Since the transmission of gamma rays through the propellant mixture is inversely proportional to the density of the propellant mix, the gamma ray intensity at the detector gives a direct indication of the propellant density.

By virtue of the determinations made within the instrumentation section, it is possible to quickly ascertain whether the propellant meets specification. If off-specification material is found, such material can be quickly diverted from the process through the proper adjustment of three-way valve 81. Further, the condition causing the deviation of the propellant material from specification can be corrected by adjusting the flow rate of the various propellant ingredients, the speed of the mixer 26, the pressures within the deaerator 68 or vessels 32 and 38, etc.

After passing through a valve 81 the propellant enters a surge tank 82 from which it is pumped by means of pump 84. After leaving the pump 84 the propellant is conveyed to the curing section. The propellant material can be discharged directly into the rocket casing at this point and cured in situ.

As will be appreciated by those skilled in art, the flow rates, pressures, and quantites of propellant materials employed in our process can be varied over a wide range to suit the particular propellant being manufactured. In order to control the process variables, there are provided in our process instrumentation means (not shown) which measure pressures and temperatures of the propellant ingredients and propellant mixture at various points within the process. This information fed to a control panel which is generally located away from the process equipment for reasons of safety. On receipt of this information, the process operator can make immediate adjustment of any of the process variables by remote controls.

To further insure safety in our process, there are provided pressure control devices in the various pieces of process equipment which are set to prevent excessive pressure build-up. This insures that pressure build-up within a particular piece of equipment will not rise to a point at which the propellant mixture could detonate.

The placement of shortened tooth 30 within the mixer 26 is more clearly shown in FIGURE 2 which is a sectional view through the mixer along the cutting plane shown as 2—2 in FIGURE 1. It should be understood that FIGURE 2 is not a sectional view of the mixer 26 as shown in FIGURE 1 since FIGURE 1 is only a schematic representation. FIGURE 2 is a view, however, that is taken along the line 2—2. As shown in FIGURE 2 the mixer generally comprises two sections 86 and 88 which are held together by means of a surrounding brace 85. The brace carries a stud 96 which is engaged by the eye member of an eyebolt 98. Eyebolt 98 passes through a hole drilled in the mixer sections 86 and 88 and is threadably connected to a lock nut 100 at its opposite end. When the lock nut 100 is screwed tight, the mixer section are held firmly together.

Another embodiment of our invention (not shown) involves holding the two halves, 86 and 88, of the mixer together with hydraulically acutated pistons. This arrangement makes possible immediate separation of the mixer halves and the consequent dumping of the mixer contents. In the event of pressure build-up within the mixer, this serves as a quick way of evacuating the mixer so as to prevent explosion.

The interrupted impeller flights which are affixed to the shaft 102 of the mixer are shown in shaded portions as, for example, 90 and 92 in the drawing. A heat transfer fluid can be circulated through the hollow shaft 102 if desired. The free space within the mixer is not shaded as, for example, in 94. Positioned radially around the periphery of the mixer are stationary teeth 28. Preferably, the teeth are positioned at 120° intervals about the periphery of the mixer. Also, since the flights of the mixer impeller have a helical configuration along the longitudinal axis of the mixer shaft, the stationary teeth 28 are longitudinally staggered so that they are interposed between the flights of the mixer impeller. The teeth 28 are fixedly held in place by means of nuts 29 which are threadably engaged with teeth 28.

Tooth 30, as shown more fully in FIGURES 3 and 4, serves as a conduit through which the liquid binder ingredients are conveyed into the mixer 26. As stated previously, it is essential that the tooth 30 be of such a length so as to introduce the liquid binder material into the mixer at a point which is within the moving oxidizer stream. This prevents the formation of agglomerates within the propellant mix and thereby greatly reduces the tendency for pressure build-up and hot spot formation within the propellant.

During operation, the mixer 26 is generally filled with material. Thus, the preferred point of introduction of the liquid binder ingredients is at a point which is approximately mid-way between the interior surface of the mixing vessel and the outside diameter of the mixer shaft 102. This is shown by the point of termination of the tooth 30 in FIGURE 2.

Turning to FIGURES 3 and 4, there is shown a detailed view of the shortened tooth 30 and its connection to the distributor head 107 through which is introduced the liquid polyol slurry and isocyanate components of the propellant mixture. FIGURE 3 is a top view of the mixing tooth 30 as shown in FIGURE 4. FIGURE 4 is a seciton of the mixer tooth 30 and distributor head 107 taken along the line 4—4 of FIGURE 3. As shown in FIGURE 4, the shortened tooth 30 extends through the wall 104 of the mixer and is held in place by means of a threaded lock nut 29 which engages a washer 31. The threaded upper portion 118 of shortened tooth 30 is engaged in corresponding threads in the distributor head 107 and is firmly connected thereto by means of a lock nut 116. A tube 106 extends through the middle of shortened tooth 30 into the interior of distributor head 107 and connects to passage 105 through which is introduced the isocyanate feed stream. Tube 106 is held firmly in place at its upper end by means of a threaded fitting 108 which is threadably engaged with the distributor head 107. Surrounding the tube 106 is an annular space 114 which is connected to passage 112 into which the polyol slurry feed stream is introduced. Tube 106 is held in place at its bottom end by means of a spider connection 120 which connects the tube with the outer portion of tooth 30. The spider connection can be affixed to the tooth by any conventional means such as spot welding.

The distributor opening 111 and flexible diaphragm 109 serve as a point through which material can be introduced into the polyol feed stream in order to measure distribution of this component within the propellant at a point downstream in the process. As an example we have found it advantageous in some cases to introduce a radioactive tracer material through diaphragm 109 by means of a syringe. The distribution of the radioactive material within the propellant at a point downstream is an accurate measure of the distribution of the polyol within the propellant. This determination can be very helpful in determining the efficiency of the mixer in terms of the uniformity of the product produced.

In operation, as shown in FIGURE 4, the polyol component is contained in the annular space 114 so as to completely surround the isocyanate component which is contained in the hollow tube 106. Thus, when both streams are introduced into the mixer, the interface between them is very large so that efficient mixing is obtained between the two streams as well as with the oxidizer stream into which they are introduced.

When our process is started up with the process equipment empty, we prefer to first introduce the polyol component into the empty mixer. The mixer is run while containing only the polyol component until its interior surfaces are thoroughly wetted. The isocyanate and oxidizer streams are then turned on simultaneously and the mixer is run until such time as equilibrium occurs. By equilibrium we mean that the propellant material emerging from the mixer has a uniform consistency and meets specification.

In some cases wetting agents other than the polyol propellant component can be employed in starting the mixer. Such wetting agents have the disadvantage, however, of introducing an impurity within the propellant which causes it to be off-specification. Thus, they must be thoroughly removed from the surface of the mixer by the material passing through it before propellants can be produced which meet specification. In contrast, use of the polyol component as the wetting agent presents no such problems since it itself is a component of the propellant.

Further, in starting our process, it is necessary to first stabilize the flow rates of the various propellant ingredients—oxidizer, polyol slurry, and isocyanate. In order to accomplish this, the various three-way valves 20, 52, and 54, as shown in FIGURE 1, are adjusted so that the oxidizer, polyol slurry, and isocyanate streams are recycled. When uniform flow rates have been established, the respective valves can then be opened with the assurance that the proper weight rates of propellant components are being introduced into the mixer.

In some instances it is necessary to shut down the mixer when it is full. When this is necessary, we have found that the various feed streams must be shut off in a properly sequenced manner in order to obtain propellants which meet specification when the mixer is started up again. With the particular mixer which we employ, we shut off the mixer and the oxidizer stream at the same time. The liquid polyol slurry and isocyanate streams are shut off approximately two seconds after the mixer and oxidizer stream. In starting up the mixer when it is full, the mixer is turned on and the liquid polyol slurry and isocyanate streams are turned on approximately two seconds later. The oxidizer stream is turned on three seconds later, or five seconds after the mixer is turned on.

The reason for observing the above procedure in turning on or shutting off the mixer when it is full is the fact that the inertia of the mixing impeller causes it to coast to a stop some eight seconds after the power to the mixer has been turned off. Thus, the mixer impeller continues to move material within the mixer after the power has been shut off. Our procedure in shutting off the oxidizer, isocyanate, and polyol streams in the above manner compensates for the coasting action of the mixing impeller and allows shut down and start up without producing off-specification propellant and high pressures in the mixer.

Although our process is such that it finds application to the continuous mixing of any solid propellant formulation, we have found it to have particular application in the formation of solid propellants incorporating polyurethane fuel. Such propellant compositions are fully disclosed in assignee's application Serial No. 829,180, now Patent No. 3,245,849, filed July 20, 1959, and application Serial No. 33,054, filed May 31, 1960. The propellants, when used as a primary propulsion source for rocket vehicles, can be ignited by a conventional igniter as, for example, shown in U.S. Patent 3,000,312, issued September 19, 1961, and assigned to the assignee of the present invention.

Typical propellants which can be formulated through use of our process are those having an asphalt binder as shown in U.S. Patent 2,563,265; those having a polyester binder as shown in U.S. application Serial No. 109,409, now Patent No. 3,031,288, filed August 9, 1949; and other types of propellants as shown in British Patent 579,057 issued July 22, 1946. Preferred binder materials are the polyurethane resins as described in more detail later. In forming such diverse propellants through use of our process, flow rates, process temperatures, etc., are varied to suit the propellant being formed. In all cases, however, the binder material is introduced within the moving oxidizer stream at a point which is downstream from the point of introduction of the oxidizer stream into the mixer. If the binder is composed of several materials, these materials are preferably introduced simultaneously into the moving oxidizer stream through a distributor as shown in FIGURES 3 and 4.

The propellant, as produced by our process, is preferably cast in tubular form and restricted in a conventional manner with a relatively inert resin, such as a non-nitrated polyurethane foam or a polyester resin, and placed inside a chamber having one end open that leads into a conventional venturi rocket nozzle. Upon ignition, large quantities of gases are produced and exhausted through the nozzle to create propulsive force.

Binders for polyurethane propellants, which constitute from about 5 to about 55 percent by weight of the propellant mixture, are prepared by reacting a compound having two or more active hydrogen groups capable of polymerizing with an isocyanate with an organic compound having as the sole reacting groups two or more isocyanate or isothiocyanate groups. The compound having the active hydrogen groups is preferably an organic compound having as its sole reacting groups hydroxyl or thiol groups.

Where there are more than two active hydrogen, isocyanate, or isothiocyanate groups present on any of the polyurethane reactants, the resulting molecular structure of the polyurethane binder will be at least to a certain extent of a cross-linked rather than a linear nature. The cross-linking is accomplished when all three functional groups of a sufficient number of the trifunctional molecules undergo the urethane reaction with other groups present in the mixture, thus resulting in a product having a "three-dimensional" molecular structure rather than mere aggregates of linear chains as is the case when bifunctional reactants are employed.

Where bifunctional reactants such as dihydroxy compounds and diisocyanates are employed to produce the binders for polyurethane propellants, it is generally desirable to employ a cross-linking agent to assure a product having a cross-linked structure. Cross-linking agents can also be used with polyurethane reactants having more than two functional groups, such as triols and/or triisocyanates. Compounds suitable as cross-linking agents for polyurethane binders are those organic compounds having as the sole reacting groups three or more groups polymerizable with hydroxy or isocyanate groups.

It will be appreciated that in any given quantity of propellant the individual polyurethane molecules may vary in number of repeating units from several to tens of thousands of these units. Hence, molecular weight figures on polyurethanes represent statistical averages. The exact nature of terminal groupings is not known and will vary depending upon whether plasticizers, polymerization catalysts, etc., are present. Moreover, a given molecule may even form a ring and thus leave no dangling radicals.

It is evident from the above that a wide variety of polyurethane propellant binders can be prepared by varying the particular starting materials.

The isocyanate starting materials for polyurethane binders are preferably diisocyanates but, as explained above, other polyisocyanates may be employed if desired. The preferred diisocyanate compounds can be saturated or unsaturated; aliphatic or aromatic; and open or closed chain. If they are closed chain, they can be monocyclic or polycyclic. Also, they can be substituted with groups which are substantially unreactive with isocyanate or hydroxyl groups such as, for example, ketone, halogen, ester, sulfide, or ether groups. The following diisocyanate compounds are particularly suitable as reactants for the preparation of binders for polyurethane propellants:

(a) Alkane diisocyanates such as:
   Ethylene diisocyanate;
   Trimethylene diisocyanate;
   Propylene-1,2,-diisocyanate;
   Tetramethylene diisocyanate;
   Butylene-1,3-diisocyanate;
   Decamethylene diisocyanate;
   Octadecamethylene diisocyanate;
etc.
(b) Alkene diisocyanates such as:
   1-propylene-1,2-diisocyanate;
   2-propylene-1,2-diisocyanate;
   1-butylene-1,2-diisocyanate;
   3-butylene-1,2-diisocyanate;
   1-butylene-1,3-diisocyanate;
   1-butylene-2,3-diisocyanate;
etc.
(c) Alkylidene diisocyanates such as:
   Ethylidene diisocyanate;
   Propylidene-1,1-diisocyanate;
   Propylidene-2,2-diisocyanate;
etc.
(d) Cycloalkylene diisocyanates such as:
   Cyclopentylene-1,3-diisocyanate;
   Cyclohexylene-1,3-diisocyanate;
   Cyclohexylene-1,2-diisocyanate;
   Cyclohexylene-1,4-diisocyanate;
etc.
(e) Cycloalkylidene diisocyanates such as:
   Cyclopentylidene diisocyanate;
   Cyclohexylidene diisocyanate;
etc.
(f) Aromatic diisocyanates such as:
   m-Phenylene diisocyanate;
   o-Phenylene diisocyanate;
   p-Phenylene diisocyanate;
   1-methyl-2,4-phenylene diisocyanate;
   Naphthylene-1,4-diisocyanate;
   Diphenylene-4,4'-diisocyanate;
   2,4-tolylene diisocyanate;
   2,6-tolylene diisocyanate;
   4,4'-diphenylmethane diisocyanate;
   1,5-naphthalene diisocyanate;
   Methylene-bis-(4-phenylisocyanate);
   2,2-propylene-bis-(4-phenylisocyanate);
etc.
(g) Aliphatic-aromatic diisocyanates such as:
   Xylylene-1,4-diisocyanate;
   Xylylene-1,3-diisocyanate;
   4,4'-diphenylenemethane diisocyanate;
   4,4'-diphenylenepropane diisocyanate;
etc.
(h) Diisocyanates containing hetero-atoms such as:
   OCN—CH$_2$CH$_2$—O—CH$_2$CH$_2$—NCO;
   2,3-pyridine diisocyanate;
etc.

The preferred hydroxy starting materials for the preparation of polyurethane binders are dihydroxy compounds having the formula HO—R—OH, where R is a divalent organic radical. The hydroxy groups on these compounds are of any type suitable for the urethane reaction with isocyanate groups such as, for example, alcohol or phenolic hydroxy groups. The following dihydroxy compounds are particularly suitable as reactants for polyurethane propellant binders:

(1) Alkane diols having a chain length of from 2 to 20 carbon atoms, inclusive, such as:
   2,2-dimethyl-1,3-propanediol;
   Ethylene glycol;
   Tetramethylene glycol;
   Hexamethylene glycol;
   Octamethylene glycol;
   Decamethylene glycol;
etc.
(2) Alkene diols such as:
   1-propylene-1,2-diol;
   2-propylene-1,3-diol;
   1-butylene-1,2-diol;
   3-butylene-1,2-diol;
   1-hexylene-1,3-diol;
   1-butylene-2,5-diol;
etc.
(3) Cycloalkylene diols such as:
   Cyclopentylene-1,3-diol;
   Cyclohexylene-1,2-diol;
   Cyclohexylene-1,3-diol;
   Cyclohexylene-1,4-diol;
etc.
(4) Aromatic diols such as:
   Catechol;
   Resorcinol;
   Quinol;
   1-methyl-2,4-benzenediol;
   2-methyl-1,3-naphthalenediol;
   2,4-tolylenediol;
etc.
(5) Aliphatic-aromatic diols such as:
   Xylylene-1,4-diol;
   Xylylene-1,3-diol;
   1,5-naphthalenedimethanol;
   2-ethyl-1-phenyl-3-butene-1,2-diol;
   2,2-di-(4-hydroxyphenyl)propane;
etc.
(6) Diols containing hetero-atoms such as:
   Di-(β-hydroxyethyl)ether;
   6-methyl-2,4-pyrimidinediol;

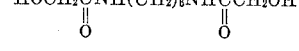

etc.

Other dihydroxy compounds suitable for the preparation of polyurethane propellant binders are polyesters such as those obtained from the reaction of a dihydric alcohol such as ethylene glycol, diethylene glycol, propylene glycol, butylene glycol, or hexamethylene glycol with a dicarboxylic acid such as succinic acid, adipic acid, sebacic acid, oxadibutyric acid, sulfodipropionic acid, and related compounds. The polyesters most suitable for this purpose are those having a molecular weight from about 1000 to about 2500. In preparing polyesters such as these, the dihydric component is permitted to react with the dicarboxylic acid component to produce the polyester. Mixtures of polyesters and an olefin such as styrene, vinyl acetate, or the like, are particularly suitable. The olefin does not react with any of the hydroxy groups present in the mixture nor does it interfere in any way with the subsequent reaction between these hydroxyl groups and the isocyanate groups in the polyurethane reaction mixture. Neither does it interfere with any reactions of cross-linking agents present in the mixture. The principal function of the olefin is to permit linkage of the polyester molecules together by means of addition polymerization through the double bonds of the olefin.

The above-mentioned polyesters can be prepared from either saturated or unsaturated dihydric alcohols and saturated or unsaturated dicarboxylic acids. The anhydrides of any of the dicarboxylic acids can be substituted for all or part of any of said acids in the preparation of polyesters suitable for the polyurethane reaction. The usual and preferred manner of making suitable polyesters is to react a mixture of an unsaturated dicarboxylic acid (such as adipic acid, sebacic acid, or the like) or anhydride and a saturated or aromatic dicarboxylic acid or anhydride with a dihydric alcohol. Examples of unsaturated dicarboxylic acids which can be employed are maleic acid, fumaric acid, citraconic acid, mesaconic acid, itaconic acid, etc.

In addition to the polyesters, polyethers such as polyethylene ether glycols, polypropylene ether glycols, other polyalkylene ether glycols, and mixtures or copolymers thereof having molecular weights of from about 400 to about 10,000 can be utilized as dihydroxy reactants in the preparation of polyurethane propellant binders.

Polysulfides having two or more thiol groups, such as ethylene disulfide and the Thiokol polysulfides produced by Thiokol Corporation and polysulfides with glycol end groups such as those having the general formula $HO(CH_2-CH_2-S-S)_x-CH_2CH_2OH$, where $x$ is a whole number, are other suitable polyurethane propellant binder reactants.

It will be appreciated by those skilled in the art that mixtures of suitable polyhydroxy and/or polyisocyanate compounds can be used for the preparation of polyurethane propellant binders if desired.

It is well-known to those skilled in the art that polyisothiocyanates and polythiol compounds react to yield urethane-type products as do the polyisocyanates and polyol compounds. Consequently, the polyisothiocyanates and polythiols corresponding to any of the pilyisocyanates or polyhydroxy compounds shown herein can be used in the preparation of propellant binders by means of our novel continuous mix process. For example, diisothiocyanates such as butylene-1,3-diisothiocyanate; ethylidene diisothiocyanate; cyclohexylene-1,2-diisothiocyanate; cyclohexylidene diisothiocyanate; p-phenylene diisothiocyanate; and xylylene-1,4-diisothiocyanate react with dithiol compounds such as decamethylene dithiol; thioresorcinol; ethylene-bis-(thioglycolate); etc.; to yield polythiourethane compounds which are suitable as solid propellant binders. Any mixture of the diisocyanates and/or diisothiocyanates suitable as reactants for polyurethane propellant binders can be reacted with any mixture of thiols and/or dithiols disclosed herein in the preparation of polyurethane propellant binders according to the continuous mix method of this invention.

It will be appreciated by those skilled in the art that a great variety and number of polyfunctional organic compounds will serve as cross-linking agents for polyurethane propellant binders. As indicated above, any organic compound having as its sole reacting groups three or more groups polymerizable with hydroxy or isocyanate groups is a suitable polyurethane cross-linking agent. This includes not only the polyfunctional hydroxy, thiol, isocyanate, and isothiocyanate compounds but compounds containing other groups polymerizable with either hydroxy or isocyanate groups as well. For example, compounds with three or more groups containing reactive hydrogen and capable of polymerization with isocyanates can be employed as cross-linking agents for polyurethane propellant binders. Examples of compounds of this class are proteins and syntheic polyamides such as polyhexamethylene adipamides.

Polyurethane cross-linking agents can be saturated or unsaturated; aliphatic or aromatic; open or closed chain; and, if the latter, monocyclic or polycyclic; and substituted or not by groups substantially unreactive with isocyanate or hydroxyl groups such as, for example, ketone, halogen, ester, sulfide, or ether groups.

Examples of suitable cross-linking agents for polyurethane propellant binders are glyceryl monoricinoleate; glyceryl triricinoleate (sometimes referred to as GTRO); 1,2,6-hexanetriol; methylene - bis - (orthochloroaniline); monohydroxyethyl trihydroxypropyl ethylenediamine; polyaryl polyisocyanates; pentaerythritolpropylene oxide adduct; N,N,N′,N′ - tetrakis-(2-hydroxypropyl)-ethylenediamine; triethanolamine; trimethylolpropane; and triisocyanates such as 2,4,6-triisocyanato benzene.

Other substances suitable as cross-linking agents are glycerol, sorbitol, dextrin, starch, cellulose, ethyl cellulose, cellulose acetate, polyvinyl acetals, polyvinyl ketals, polyvinyl alcohol, diethylenetriamine, polyvinyl mercaptans, and shellac.

As in the case of the polyurethane reactants, mixtures of the various polyurethane cross-linking agents can be employed if desired.

It is of particular advantage in many cases to employ up to about 30 percent by weight of finely divided metallic aluminum as a polyurethane propellant ingredient. The use of the aluminum has several advantages. For example, its use results in relatively high specific impulse in the final propellant. The advantages of aluminum as a polyurethane propellant additive are described in greater detail in assignee's copending application Serial No. 33,054, filed May 31, 1960. Aluminum is preferably employed as a polyurethane propellant ingredient in finely divided form. Although particle size of the aluminum is not critical, its combustion efficiency tends to decrease to a certain extent as the particle size increases above about $25\mu$. Below $25\mu$ no such effect has been observed. Thus, the preferred particle sizes are those of about $25\mu$ and below.

The oxidizers for our solid propellants, which can be present in from about 45 to about 95 percent by weight of the propellant composition, can be any solid inorganic oxidizing salts such as, for example, the chromates, dichromates, permanganates, nitrates, chlorates, and perchlorates of the alkali or alkaline earth metals such as potassium, sodium, or calcium; ammonia; hydrazine; or guanidine.

The selection of the oxidizing salt depends upon the specific burning properties desired in the propellant grain. Thus, where a low smoke propellant is desired a nonmetallic oxidizing salt such as ammonium perchlorate or ammonium nitrate should be employed rather than an oxidizing salt containing a metal such as sodium nitrate, potassium perchlorate, or calcium chloride. Mixtures of suitable inorganic oxidizing salts can be incorporated into solid propellants if desired.

Various additives are normally employed in the preparation of polyurethane binders for solid propellants. For example, plasticizers familiar to those skilled in the art such as isodecyl pelargonate; 4-nitrazapentanonitrile; 2,2-dinitropropyl - 4 - nitrazapentanoate; dioctyl azelate; etc.; as well as those commercially available as such, may be utilized. Also, catalysts for the polyurethane reaction such as triethylamine and other tertiary amines; ferric acetylacetonate and other metal acetylacetonates such as vanadyl acetylacetonate, etc.; boron trifluoride, etc.; can be employed if desired. The catalyst can be employed in quantities within the range from mere traces up to amounts equivalent to about one percent by weight of the total mass and even higher. Normally amounts of from about 0.02 to about 0.10 percent by weight, on a total weight basis, are employed.

Burning rate modifiers and other additives such as antioxidants, wetting agents, antifoaming agents, etc., can be and normally are employed in the formulation of solid propellants. It has been found that the copper chromite, such as the commercially available CuO202, and finely divided carbon black, such as that available under the trade name P-33, are useful for increasing the burning rate of polyurethane propellants. Copper chromite and finely divided carbon black can be employed separately or together in propellant formulations and are preferably added in small quantities comprising not greater than about 2 percent (and for best results not greater than about 1 percent) of the total propellant weight. It has also been found that certain well-known wetting agents such as lecithin are useful processing aids in the preparation of polyurethane propellants. A wetting agent particularly suitable for such purpose is that known commercially as G-2684. For best results, wetting agents should be employed in proportions comprising not more than about 1 percent by weight of the total propellant composition and preferably in proportions much lower than this. Various additives other than those specifically referred to above have been utilized in minor amounts in polyurethane propellant formulations. For example, phenyl-$\beta$-naphthylamine and N,N'-di-$\beta$-naphthylphenyl-diamine are useful antioxidants when added in very small amounts to polyurethane propellants.

The proportions of the ingredients employed for the preparation of polyurethane binders can be varied through wide ranges depending on the propellant properties desired and the specific reactants employed. It has been found, however, that a product of improved mechanical properties is obtained if there is a slight excess of isocyanate groups over hydroxy groups in the binder mixture. Consequently, for best results, from about 100 to about 115 equivalents of isocyanate- or isothiocyanate-containing monomer component is employed for every 100 equivalents of hydroxy- or thiol-containing monomer component in the binder mixture.

There can be more than one isocyanate compound or equivalent as well as more than one hydroxy compound or equivalent in polyurethane binder mixtures. In this case the calculation of excess isocyanate groups over the hydroxy groups present is based upon the total amounts of these materials. For example, where the cross-linker is a polyhydroxy compound the excess of isocyanate or equivalent compound is calculated as an excess over the amount of diol or equivalent plus the amount of cross-linker present. The relative proportions of diol and cross-linker can be varied through wide ranges, the only requirement being that a cross-linked structure be obtained in the binder.

The various additives and minor components of polyurethane propellants (those ingredients other than the urethane and cross-linker reactants, oxidizer, and aluminum, where aluminum is present) ordinarily comprise a very small percentage of the total propellant weight. Thus, these components will generally be present in combined amount not greater than about 10 percent, and more often about 4 or 5 percent, of the total propellant weight.

Having fully defined our novel process, we desire to be limited only by the scope of the appended claims.

We claim:

1. Process for continuously mixing the ingredients for a solid propellant comprising forming a moving stream of solid oxidizer material, introducing a stream of a resin binder within said oxidizer stream, and mixing the oxidizer and binder materials until a uniform composition has been obtained.

2. The process of claim 1 in which said uniformly mixed propellant composition is then subjected to deaeration.

3. The process of claim 1 wherein said stream of resin binder comprises two separate streams, the first of which contains a compound having an active hydrogen group capable of polymerizing with an isocyanate, and the second of which contains a compound having at least two substituent groups selected from the class consisting of isocyanates and isothiocyanates, said streams being introduced into the oxidizer stream in such a manner that one of said streams surrounds the other of said streams at their point of introduction.

4. The process of claim 3 wherein said first stream surrounds said second stream.

5. The process of claim 2 in which said uniformly mixed propellant composition is cooled during the deaeration step.

6. Process for continuously mixing the ingredients for a solid propellant comprising forming a moving stream of solid oxidizer material, introducing a stream of resin binder within said solid oxidizer stream, mixing said oxidizer and resin binder materals until a uniform composition has been obtained, and deaerating said uniform composition under vacuum.

7. The process of claim 6 wherein the temperature of said uniformly mixed propellant composition is controlled during deaeration whereby the viscosity of the uniformly mixed propellant material is kept at a sufficiently low level so that it can be readily pumped without the use of high pressure.

8. Process comprising forming a moving stream of solid oxidizer material within a mixer having a rotatable impeller positoned along its longitudinal axis and adapted to move the stream of solid oxidizable material through the mixer, injecting a resin within the body of said stream of solid oxidizer material from an injector projecting radially into the interior of said mixer, and continuing the mixing operation until a uniform composition has been obtained.

9. The process of claim 8 wherein said resin is composed of several binder ingredients, each of which is fed into the mixer through said injector, said injector comprising an inner tube and an annular passage surrounding said tube whereby one of the binder ingredients is fed through said inner tube and the other of said binder ingredients is fed through said annular passage.

References Cited by the Examiner

UNITED STATES PATENTS

| | | | |
|---|---|---|---|
| 2,863,649 | 12/1958 | Grubb et al. | 259—9 |
| 2,952,530 | 9/1960 | St. John | 149—19 |
| 2,953,360 | 9/1960 | Kline | 259—9 |
| 2,972,473 | 2/1961 | Heller | 259—9 |
| 3,014,796 | 12/1961 | Long et al. | 149—19 |
| 3,022,149 | 2/1962 | Cramer | 149—19 |
| 3,070,470 | 12/1962 | Argabright et al. | 149—60 X |

BENJAMIN R. PADGETT, *Primary Examiner.*

LEON D. ROSDOL, CARL D. QUAFORTH,
*Examiners.*